(12) United States Patent
Hoyes et al.

(10) Patent No.: US 8,876,118 B2
(45) Date of Patent: *Nov. 4, 2014

(54) GASKETS

(75) Inventors: John Robert Hoyes, Littleborough (GB); Stephen Woolfenden, Rochdale (GB)

(73) Assignee: Flexitallic Investments Inc., Kingwood, TX (US)

( * ) Notice: Subject to any disclaimer, the term of this patent is extended or adjusted under 35 U.S.C. 154(b) by 1663 days.

This patent is subject to a terminal disclaimer.

(21) Appl. No.: 10/886,736

(22) Filed: Jul. 8, 2004

(65) Prior Publication Data

US 2005/0006858 A1  Jan. 13, 2005

Related U.S. Application Data

(62) Division of application No. 10/181,116, filed as application No. PCT/GB01/00097 on Jan. 12, 2001, now Pat. No. 7,204,492.

(30) Foreign Application Priority Data

Jan. 14, 2000 (GB) .................................. 0000712.0

(51) Int. Cl.
*F16L 17/06* (2006.01)
*F16J 15/02* (2006.01)
*F16J 15/12* (2006.01)

(52) U.S. Cl.
CPC ..................................... *F16J 15/125* (2013.01)
USPC .......................................... 277/610; 277/633

(58) Field of Classification Search
USPC .................... 277/610, 633; 524/442, 444–446
See application file for complete search history.

(56) References Cited

U.S. PATENT DOCUMENTS 1,942,704 A  1/1934  Hubbard et al.
3,108,818 A  10/1963  Furstenburg
(Continued)

FOREIGN PATENT DOCUMENTS

EP  1541013  2/1979
EP  0038293  10/1981
(Continued)

OTHER PUBLICATIONS

M. Dol, C. Robbe, and L. Voogd in Requirements for Asbestos Substitutes for Jointing, Packing and Sealing Materials, May 1992, Shell International Petroleum Maatschappij B.V., The Hague.
Gooding, et al., "Fractionation in a Bauer-McNett Classifier," Journal of Pulp and Paper Science, Dec. 2001, vol. 27, No. 12.
PCT/GB2006/000084 International Search Report dated Apr. 26, 2006.
PCT/GB2006/000084 International Preliminary Report on Patentability dated May 2, 2007.

(Continued)

*Primary Examiner* — Vishal Patel
(74) *Attorney, Agent, or Firm* — Kilpatrick Townsend & Stockton LLP

(57) ABSTRACT

The gasket includes a sealing strip comprising a resilient material, the resilient material comprising a chemically exfoliated vermiculite (CEV) component in a proportion of at least 25% w/w of the sealing strip, the said CEV component being at least partially derived from dry CEV, wherein the sealing strip does not include a carrier strip, made by the process of the application of a wet sealing strip material to a forming sheet to form a layer; partially drying the wet sealing strip layer on the forming sheet; removing the layer from the forming sheet; and (d) cutting the layer into strips suitable for use in the formation of a spirally wound gasket.

23 Claims, 1 Drawing Sheet

(56) References Cited

U.S. PATENT DOCUMENTS

| | | | |
|---|---|---|---|
| 4,042,747 A | | 8/1977 | Breton et al. |
| 4,127,277 A | * | 11/1978 | Owen et al. .................. 277/633 |
| 4,271,228 A | | 6/1981 | Foster |
| 4,297,139 A | | 10/1981 | Beall et al. |
| 4,324,838 A | | 4/1982 | Ballard et al. |
| 4,477,094 A | | 10/1984 | Yamamoto et al. |
| 4,486,235 A | | 12/1984 | Kamigaito et al. |
| 4,486,253 A | | 12/1984 | Gonia |
| 4,529,662 A | | 7/1985 | Lancaster et al. |
| 4,629,199 A | | 12/1986 | Yamamoto et al. |
| 4,655,482 A | | 4/1987 | Myers et al. |
| 4,762,641 A | * | 8/1988 | Denton et al. ............ 252/378 R |
| 4,762,643 A | | 8/1988 | Bohrn et al. |
| 4,778,189 A | | 10/1988 | Udagawa |
| 4,780,147 A | | 10/1988 | Ou et al. |
| 4,814,215 A | | 3/1989 | Lautenschlaeger et al. |
| 4,859,526 A | | 8/1989 | Potepan et al. |
| 4,877,551 A | | 10/1989 | Lukacs, III |
| 4,915,871 A | | 4/1990 | Atkinson et al. |
| 4,929,429 A | | 5/1990 | Merry |
| 4,961,988 A | | 10/1990 | Zhu |
| 4,962,938 A | | 10/1990 | Cooper |
| 4,965,117 A | | 10/1990 | Lautenschlaeger et al. |
| 5,028,397 A | | 7/1991 | Merry |
| 5,139,615 A | | 8/1992 | Conner et al. |
| 5,336,348 A | | 8/1994 | Mindler |
| 5,437,767 A | | 8/1995 | Halout et al. |
| 5,472,214 A | | 12/1995 | Wainer et al. |
| 5,536,565 A | | 7/1996 | Halout et al. |
| 5,913,522 A | | 6/1999 | Koch |
| 6,121,360 A | | 9/2000 | Hoyes et al. |
| 6,270,083 B1 | | 8/2001 | Hirschvogel et al. |
| 6,610,771 B1 | | 8/2003 | Hoyes et al. |
| 6,626,439 B1 | | 9/2003 | Forry et al. |
| 6,682,081 B2 | | 1/2004 | Burton et al. |
| 6,948,717 B1 | | 9/2005 | Carr |
| 7,121,556 B2 | | 10/2006 | Barth et al. |
| 7,321,009 B2 | | 1/2008 | Hoyes et al. |
| 2003/0132579 A1 | | 7/2003 | Hoyes et al. |
| 2005/0284595 A1 | | 12/2005 | Conley et al. |
| 2008/0012324 A1 | | 1/2008 | Dole et al. |
| 2009/0162672 A1 | | 6/2009 | Dunn et al. |

FOREIGN PATENT DOCUMENTS

| | | |
|---|---|---|
| EP | 0326926 | 8/1989 |
| EP | 0331987 | 9/1989 |
| EP | 0339343 | 11/1989 |
| EP | 0379636 | 8/1990 |
| EP | 0523339 | 1/1993 |
| GB | 2094821 | 9/1982 |
| GB | 2122699 | 1/1984 |
| GB | 2123034 | 1/1984 |
| GB | 2193953 | 2/1988 |
| GB | 2204266 | 11/1988 |
| GB | 2217742 | 11/1989 |
| GB | 2236756 | 4/1991 |
| GB | 2346888 | 8/2000 |
| JP | 55002060 | 1/1980 |
| JP | 56086264 | 7/1981 |
| JP | 56156437 | 12/1981 |
| JP | 57006158 | 1/1982 |
| JP | 61120880 | 6/1986 |
| JP | 63183976 | 7/1988 |
| JP | 01-311130 | 12/1989 |
| JP | 1313321 | 12/1989 |
| JP | 3197027 | 8/1991 |
| JP | 3229785 | 10/1991 |
| JP | 3234971 | 10/1991 |
| JP | 05-070763 | 3/1993 |
| JP | 5140535 | 6/1993 |
| JP | 5171134 | 7/1993 |
| JP | H07502562 | 3/1995 |
| JP | 8217919 | 8/1996 |
| JP | 2000-081143 | 3/2000 |
| JP | 2002-502448 | 1/2002 |
| RU | 2282083 | 8/2006 |
| WO | 93-04118 | 3/1993 |
| WO | WO-94/02760 | 2/1994 |
| WO | 98-39585 | 9/1998 |
| WO | 98-53022 | 11/1998 |
| WO | WO-98/53022 | 11/1998 |
| WO | WO 0151834 | 7/2001 |
| WO | WO-03004578 | 1/2003 |

OTHER PUBLICATIONS

Search Report under Section 17 dated Sep. 24, 1997 in related GB patent application 9710298.2.
Search Report under Section 17 dated Sep. 24, 1997 in related GB patent application 9710305.5.
Search Report under Section 17 dated Sep. 24, 1997 in related GB patent application 9712117.2.
Office Action Summary undated in related U.S. Appl. No. 09/424,123.
Office Action dated Jan. 20, 2011 in related U.S. Appl. No. 11/813,764.
Final Office Action dated Mar. 23, 2005 in related U.S. Appl. No. 10/181,116.
International Search Report dated Dec. 8, 1992 in related International Application No. PCT/US92/06733.
International Search Report dated Nov. 3, 1993 in related International Application No. PCT/GB93/01510.
Office Communication dated Jul. 12, 2010 in related EP Application No. 00107663.7.
European Search Report dated May 14, 2008 in related EP Application No. EP00107663.
Office Communication dated Oct. 9, 2009 in related EP Application No. 01104077.1.
Office Communication dated Sep. 2, 2008 in related EP Application No. 02740931.7.
Office Communication dated Nov. 27, 2009 in related EP Application No. 02740931.7.
Office Communication dated May 4, 2009 in related EP Application No. 02740931.7.
Office Communication dated Apr. 27, 2010 in related EP Application No. 02740931.7.
Office Communication dated Aug. 4, 2010 in related EP Application No. 02740931.7.
Response and Amendment to Examiner's Communication dated Aug. 11, 2010 in related EP patent application 06703312.6 derived from PCT/GB2006/000084.
International Search Report dated Apr. 3, 2001 in related International Application No. PCT/GB01/00097.
International Preliminary Examination Report dated Mar. 14, 2002 in related International Application No. PCT/GB01/00097.
International Search Report dated Oct. 23, 2002 in related International Application No. PCT/GB02/03062.
International Preliminary Examination Report dated Feb. 12, 2003 in related International Application No. PCT/GB02/03062.
International Search Report dated May 7, 1999 in related International Application No. PCT/GB98/01309.
International Preliminary Examination Report dated May 7, 1999 in related International Application No. PCT/GB98/01309.
Response and Amendment to Examiner's Communication dated Dec. 31, 2008 in related EP patent application 06703312.6 derived from PCT/GB2006/000084.
Office Action dated Sep. 22, 2011 in related Japanese patent application 2009-010658.
Non Final Office Action in related U.S. Appl. No. 11/813,764, dated Feb. 27, 2014, 20 pages.

* cited by examiner

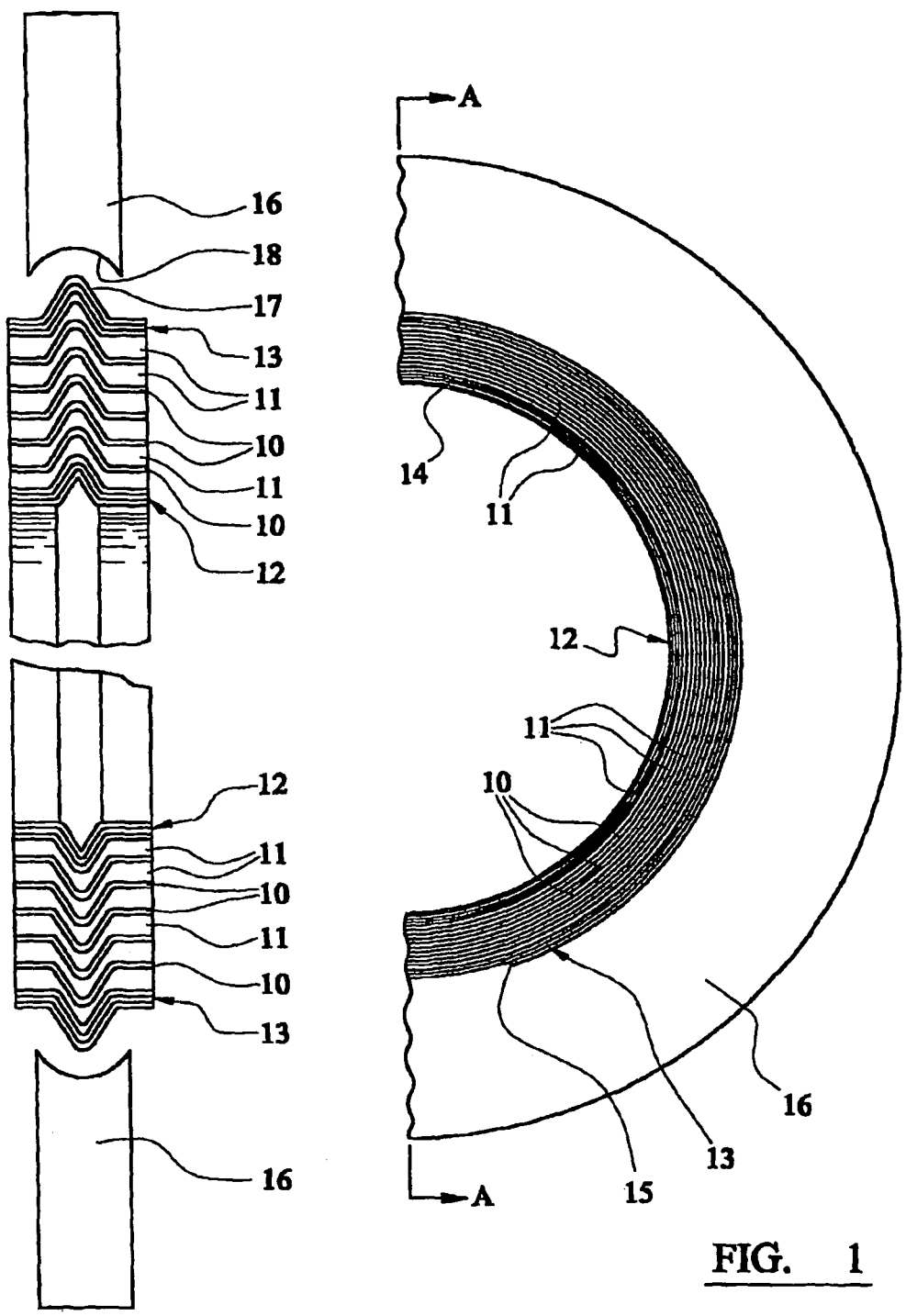

GASKETS

CROSS REFERENCE TO RELATED APPLICATIONS

This application is a divisional application of U.S. application Ser. No. 10/181,116, filed Oct. 3, 2002, which issued as U.S. Pat. No. 7,204,492 on Apr. 17, 2007. U.S. application Ser. No. 10/181,116 is the U.S. National Phase Application of the International Application No. PCT/GB01/00097, filed on Jan. 12, 2001, which claims priority to Great Britain patent application serial number 000712.0, filed on Jan. 14, 2000, the disclosures of which are herein incorporated by reference in their entireties.

BACKGROUND OF THE INVENTION

The present invention is concerned with gaskets, in particular, with spirally wound gaskets having a sealing layer with enhanced properties which is based upon chemically exfoliated vermiculite.

Exfoliated vermiculite is a known heat-resistant resilient material. Exfoliated vermiculite is conventionally formed by expanding mineral vermiculite using gas, this material being referred to herein as "gas-exfoliated vermiculite". The gas may be thermally generated, in which case the product is called "thermally-exfoliated vermiculite" (TEV). TEV may be made by flash-heating mineral vermiculite to 750-1000° C., at which temperature the water (free and combined) in the ore vaporises rapidly and ionic repulsion forces apart the silicate sheets which form the raw material, so bringing about an expansion of 10-20 times perpendicular to the plane of the sheets. The granules formed have a chemical composition which (apart from the loss of water) is virtually identical to that of the raw material. Gas-exfoliated vermiculite may also be made by treating raw vermiculite with a liquid chemical, eg hydrogen peroxide, that penetrates between the silicate sheets and subsequently evolves a gas, eg oxygen, to bring about exfoliation.

A different form of exfoliated vermiculite is known as "chemically-exfoliated vermiculite" (CEV) and is formed by treating the ore and swelling it in water. In one possible preparation method, the ore is treated with saturated sodium chloride solution to exchange magnesium ions for sodium ions, and then with n-butyl ammonium chloride to replace sodium ions with $n-C_4$—$H_9NH_3$ ions. On washing with water swelling takes place. The swollen material is then subjected to high shear to produce an aqueous suspension of very fine (diameter below 50 µm) vermiculite particles.

It is known to utilise exfoliated vermiculite as a layer of a sheet gasket, eg an automotive exhaust gasket, and for other purposes. For example, GB 2 193 953 B discloses forming sheet-like gaskets formed from particles of gas-exfoliated vermiculite. Because such particles do not cohere well, they are bound together by fine particles of CEV. The use of CEV as a binder retains heat resistance and resilience, whereas the use of other inorganic binders could result in an incompressible structure. However, although exfoliated vermiculite has excellent heat resistance and a high degree of resilience, it has poor water resistance. Furthermore, such products were manufactured using CEV with a high water content at low solids content and considerable drying problems are encountered during production due to the tendency of CEV containing materials to form a surface skin which prevents the further escape of moisture.

Spirally wound gaskets are well-known and are formed from a metal supporting strip, conventionally of steel, and a sealing strip formed from a resilient material, conventionally expanded graphite (also called exfoliated graphite). In the formation of conventional spirally wound gaskets, the steel supporting strip is fed onto a mandrel. The steel supporting strip is welded either to itself to form a closed loop around the mandrel or, alternatively, is welded to an inner ring of the gasket which is itself mounted on the mandrel. The mandrel is then rotated to draw further supporting strip on to the mandrel to form a planar spiral. Simultaneously, the sealing strip is drawn between the coils of the steel strip so that a spiral of the sealing strip is formed interposed between the coils of the supporting strip. When the gasket spiral has been completed, the steel supporting strip is welded to itself to form a closed loop at the outside of the gasket and the gasket is removed from the mandrel. Such gaskets are utilised, for example, for forming seals between flanges at the ends of pipes. The supporting strip holds the sealing strip in position and the sealing strip forms a seal between the flanges and between the coils of the supporting strip.

It should be clear, from the above description of how spirally wound gaskets are formed that, the sealing strip thereof must have sufficient strength and flexibility to enable it to be drawn into the spiral and formed into a gasket without breakage. A sealing strip formed from expanded graphite foil, although relatively brittle, does have sufficient strength.

In many cases, it is desirable for a spirally wound gasket to have a high degree of heat resistance but, in a conventional gasket, the heat resistance is limited by that of the expanded graphite which is lower than is desirable.

It is a further object of at least some of the preferred embodiments of the present invention to provide a spirally wound gasket in which the sealing strip has increased heat resistance.

WO98/53022 discloses the possibility of a spirally wound gasket having a sealing strip produced from CEV compositions with a carrier strip to prevent breakage of the resilient material which otherwise is deemed to be too brittle to allow formation of a spirally wound gasket. This technique has encountered problems with delamination of the carrier strip during slitting of the resilient layer. As a result, adhesive has been applied in some instances to the resilient layer to prevent delamination from the carrier strip.

Unfortunately, providing adhesive increases the organic content in the resilient layer and organic components tend to burn out at elevated temperatures causing voids to form which provide leakage pathways through the material, shrinkage and stress relaxation.

Furthermore, use of a carrier strip increases processing cost and complexity. As the use of graphite with carrier strips does not provide leakage problems, ways of applying the carrier strip technology to brittle vermiculite materials have been on-going but without effective solutions to date.

It is a further object of at least some of the preferred embodiments of the present invention to provide a spirally wound gasket comprising a sealing layer with improved water resistance. It is a further such object to provide a spirally wound gasket with a sealing layer with reduced loss in stress retention and low creep. It is a further such object of the present invention to provide a spirally wound gasket with surprising improvements.

BRIEF DESCRIPTION OF THE DRAWINGS

FIG. 1 is a plan view of a spiral wound gasket; and
FIG. 2 is a cross-sectional view of the spiral wound gasket of FIG. 1.

DETAILED DESCRIPTION OF THE INVENTION (As used in this application and the claims, the abbreviation w/w means weight of the component material divided by the total weight of the component. For example, as used above, the weight of the CEV component of the sealing strip is at least 25% of the total weight of the sealing strip.)

According to a first aspect of the present invention there is provided a spirally wound gasket comprising a sealing strip wound into a spiral and a support strip wound into a spiral in such a manner that the spiral of the sealing strip is formed interposed between the coils of the supporting strip, the sealing strip comprising a resilient material, the resilient material comprising a CEV component in a proportion of at least 25% w/w of the sealing strip, the said CEV component being at least partially derived from dry CEV, wherein the sealing strip does not include a carrier strip.

Preferably, the resilient material also comprises a hydrolysis resistant polymer to improve the water resistance of said sealing strip, the proportion of the said polymer not exceeding 20% w/w of the sealing strip.

Surprisingly, it has been found that the use of such levels of CEV give the sealing strip sufficient strength to be wound into a spiral without the use of a carrier strip whereas hitherto it had been expected that the use of vermiculite rendered the sealing strip too brittle for winding purposes without the use of a carrier strip.

Preferably, the resilient material further comprises a plate like filler material, preferably, a milled filler material.

Preferably, the sealing strip has a small moisture content during spiral winding and, preferably, during removal from a forming sheet on which the sealing strips or layers are formed.

Preferably, the moisture content sufficiently reduces the brittleness of the strip or sufficiently increases the cohesion of the strip to allow said spiral winding and removal from the forming sheet without damage, such as splitting or tearing, to the strip.

For the avoidance of doubt, a spirally wound gasket of the present invention may provide conventional sealing between static parts. An example of the latter would be valve stem sealing.

Preferably, the proportion of CEV is at least 30% w/w of the sealing strip, more preferably at least 35% w/w of the sealing strip.

Typically, the level of CEV falls within the range 25-80% w/w of the sealing strip, more typically, 30-75% w/w of the sealing strip, most typically 35-70% w/w of the sealing strip.

Preferably, the proportion of the said polymer is less than 15% w/w of the sealing strip, more preferably, less than 10% w/w. Especially preferred is a level of polymer less than 7.5% w/w, more especially preferred is a level of polymer in the range 1.0-7.5% w/w of the sealing strip.

Preferably, the chemically exfoliated vermiculite component of the present invention includes sufficient dry CEV, to provide a wet sealing layer dough with a reduced water content which is capable of being dried before substantial skinning has occurred.

The term hydrolysis resistant polymer includes any suitable elastomer such as silicon and carbon based elastomeric polymers. Suitable polymers for use with the present invention include: nitrile butadiene rubbers, styrene butadiene rubbers, natural rubber, butyl rubber, siloxanes (particularly organosiloxanes such as dialkyl siloxanes) and ethylene-propyldiene monomer. Diene-based polymers are suitable because they are flexible and hydrolysis-resistant.

The support strip may be made of any suitable support material with which the sealing layer may be wound to form the spirally wound gasket. Suitable support strip materials include stainless steel and special alloys such as Inconel and Hastoloy which may both be in the form of thin strips.

According to a second aspect of the present invention there is provided a spirally wound gasket comprising a sealing strip wound into a spiral and a support strip wound into a spiral in such a manner that the spiral of the sealing strip is formed interposed between the coils of the supporting strip, the sealing strip comprising a resilient material, the resilient material comprising a CEV component in a proportion of at least 25% w/w of the sealing strip, the said CEV component being at least partially derived from dry CEV, wherein the sealing strip has a moisture level of between 3-20% w/w of the sealing strip resilient material during winding into the said gasket.

Preferably, the moisture level of the sealing strip during winding is between 2-10% w/w of the resilient material of the sealing strip, most preferably, 3-5% w/w.

Preferably, the sealing strip comprises 80% resilient material, more preferably 90% resilient material, most preferably, it consists substantially wholly of resilient material.

The sealing strip in accordance with this aspect of the invention may or may not include a carrier strip.

According to a third aspect of the present invention there is provided a method of producing a sealing strip for a spirally wound gasket in accordance with the first or second aspect of the invention comprising the steps of:
(a) the application of a wet sealing strip material to a forming sheet to form a layer,
(b) partially drying the said wet sealing strip layer on the forming sheet,
(c) removing the layer from the forming sheet, and
(d) cutting the layer into strips suitable for use in the formation of a spirally wound gasket.

Preferably, the solids content of the wet sealing strip material prior to the drying step is in the range 20-70% w/w of the material.

It is also envisaged that the step (c) may be carried out after step (d).

Preferably, the forming sheet is capable of withstanding drying temperatures applied to the wet sealing strip layer. The forming sheet may be stainless steel, a non-reactive polymer such as PTFE or other suitable material to which the layer does not stick.

Preferably, the solids content of the said sealing strip layer is in the range 25-60% w/w of the wet material, more preferably, 30-55% w/w of the wet material, most preferably, 35-50% w/w of the wet material.

Preferably, in accordance with any aspect of the present invention the CEV is mixed with a suitable plate-like filling agent such as thermally exfoliated vermiculite (TEV). Preferably, the filling agent is milled. Preferably, the filling agent comprises less than 75% w/w of the sealing strip, more preferably, less than 70% w/w, most preferably, less than 65% w/w of the sealing strip. Preferably, the water content of the partially dried layer during removal from the forming sheet is 3-20% w/w, more preferably 5-15%, most preferably 7-13%. The forming sheet may be a moving belt which may be continuous or not. In many cases the TEV content in the layer is less than 55%

A further drying step may be carried out after removal of the sealing layer material from the forming layer.

A wet sealing strip layer material dough in accordance with the present invention may be dried at temperatures between 50-135° C., more preferably, 60-130° C., most preferably, 80-125° C. The material may also be allowed to dry around room temperature but it is envisaged that this will be difficult to commercialise.

Preferably, the wet sealing strip material is spread onto the forming sheet using a suitable spreading technique such as the application of a doctor blade. Calendering is also envisaged.

Preferably, the wet sealing strip material is in the form of a spreadable paste, preferably, a thin paste or a thick slurry consistency is utilised.

Preferably, the relative ratio of non-dry derived CEV to dry CEV in the dried sealing strip component is between 0.01:1 and 20:1, more preferably between 0.05:1 and 10:1, most preferably between 0.1:1 and b 4:1.

Since CEV is a relatively expensive material compared with gas-exfoliated vermiculite, eg TEV, in a spirally wound gasket according to the invention, the resilient layer may also comprise particles of gas-exfoliated vermiculite, eg the strip may comprise particles of gas-exfoliated vermiculite bonded with the particles of CEV. The material used may be milled or otherwise reduced in particle size to a particle size of less than 50 µm, however, preferably, the particle size of at least a substantial proportion is more than 50 µm, preferably, 50-300 µm, more preferably 50-250 µm, most preferably 50-200 µm. Other possible additives include talc, mica and unexfoliated vermiculite.

By dry CEV is meant CEV having a moisture content of less than 20% w/w, more preferably, less than 10% w/w, most preferably, less than 5% w/w.

Preferably, the CEV component in the wet material comprises a mixture of dried CEV and CEV available in a slurry form. However, it is necessary to use sufficient dried CEV to give an acceptable solids content. A high solids content in the wet material assists reduction in skinning in the subsequent drying process whilst maintaining a high solids content in accordance with the invention.

Preferably, the dry CEV is prepared by a suitable drying technique. Suitable drying techniques include:
cake drying and pulverising;
film drying and pulverising;
rotary hot air drying;
spray drying;
freeze drying;
pneumatic drying;
fluidised bed drying of partially dried solid; and
vacuum methods including vacuum shelf drying.

Preferably, any of the features or any preferred features of any aspect of the present invention may be combined with the first aspect and the reference to the first aspect in the method of the second aspect should be interpreted accordingly.

When utilised, the hydrolysis resistant polymer may be coupled to the vermiculite by a coupling agent.

In a spirally wound gasket according to this preferred aspect of the invention, it is found that the layer is more water resistant than a material containing only vermiculite and a coupling agent and also more water resistant than a material containing only vermiculite and a polymer.

The coupling agent may be a silane, eg a vinyl functional silane such as triethoxy vinyl silane $(CH_3CH_2O)_3SiCH=CH_2$.

It is also possible for the resilient material to comprise unexfoliated (intumescent) vermiculite which can, on heating of the gasket, eg in situ, form TEV to swell the resilient layer and, thus improve sealing.

The resilient material may be bonded to the support strip by adhesive but it may be advantageous if it is mechanically bonded. Preferably, however, no adhesive is required.

Preferably, the support strip has end portions which are not bonded to the resilient material so that these end portions can be welded in the formation of the gasket.

In a spirally wound gasket according to any aspect of the invention, it is found that the particles of the plate-like filler when present, tend to orientate themselves into the plane of the strip and act like a large number of tiny leaf springs, thereby improving sealing.

In accordance with any aspect of the present invention the plate-like filler may be selected from the group consisting of talc, molybdenum disulphide, hexagonal boron nitride, soapstone, pyrophyllite, milled thermally exfoliated vermiculite, mica, fluoromica, powdered graphite, glass flake, metal flake, ceramic flake, or kaolinites. However, a particularly preferred vermiculite material is one with a plate size substantially in the range 50-300 µm for example FPSV available from W R Grace & Co. FPSV is a registered trade mark of W R Grace & Co.

In general, a plate-like filler has an average width of plates of at least three times the average thickness.

The sealing layer may comprise 5-80%, eg 20-50%, by weight of the plate-like filler, preferably, 25-40% of the plate like filler is present in the dried sealing layer.

It is a still further object of any aspect of the present invention to provide a spirally wound gasket comprising a sealing strip based on exfoliated vermiculite, which strip comprises a polymeric binder, the strip providing improved sealing at temperatures at which the binder degrades.

Optionally, the sealing strip of any aspect of the present invention also comprises an intumescent material selected so that it expands at temperatures at which said hydrolysis resistant polymer degrades.

In a spirally wound gasket according to this optional feature of the invention, at temperatures which cause the binder to degrade, the intumescent material expands to at least partially fill the void left by the binder, thereby helping to maintain sealing.

Preferably, the intumescent material is unexfoliated vermiculite because, after exfoliation, it has good heat resistance. Another possibility is to use partially exfoliated vermiculite, ie vermiculite which has been exfoliated at a lower temperature than is normally required to fully exfoliate it. The unexfoliated or partially exfoliated vermiculite may be treated (by methods which are known per se) to reduce the temperature at which exfoliation occurs, eg the temperature can be reduced to as low as 160° C. Other possible intumescent materials include expandable graphite, sodium silicate, and perlite.

The intumescent material may form up to 50% by weight of the layer but up to 20% is preferred.

In order that the invention be better understood, embodiments of it will now be described by way of example with reference to the accompanying drawings in which FIGS. 1 and 2 illustrate the construction of a conventional spiral wound gasket.

Referring firstly to FIGS. 1 and 2, FIG. 1 is a plan view of approximately half of a spiral wound gasket complete with half of its associated guide ring. FIG. 2 is a cross-sectional view taken on line A-A of FIG. 1. It is shown slightly enlarged for purposes of illustration. In the Figures, the gasket comprises a plurality of turns of a generally "V" cross-section metal strip. The innermost turns 12 and the outermost turns 13 are free from gasket material. The inner free end 14 is secured by spot welding to the adjacent underlying turn; the outer free end 15 is likewise secured to the adjacent underlying turn; also by spot welding. A plurality of turns 11 of a relatively soft gasket material 11, in accordance with the invention, are interleaved with the intermediate metal turns 10 during winding, as best seen in FIG. 2. The overall spiral structure is thus a laminate sandwiched between plain metal turns.

The radially outer rim of the spiral has a nose region 17 defined by the apex of the "V" cross section. This enables it to be "snapped into" an outer guide ring 16, the inner edge of which is provided with a machined or pressed groove 18 to receive it.

In use, the guide ring 16 is used to centre the complete gasket within the bolt circle of a flanged pipe joint, in the usual way, (not shown). The bolts are tightened so that the opposed flanges apply pressure to the front and rear faces of the spiral wound annulus. This is then progressively compressed through deformation of the "V" shaped cross-section until the pipe flanges seat onto the faces of the guide ring 16. The loading required to achieve this in a typical, conventional gasket is very high, as is discussed elsewhere in this specification.

EXAMPLES

There now follows a detailed description of illustrative examples according to the different aspects of the invention.

Test Method

To test the functionality of a gasket, one of the most appropriate tests is one developed by the Shell Petroleum Company and this test was used to evaluate the examples.

The SHELL Test Procedure

This involves subjecting the test sample (in this case, 4" class 300 spiral wound gaskets) to an ambient temperature sealing test, followed by an elevated temperature sealing test (450° C.). The test apparatus consists of two, raised face flanges, with a sealing face finished to Ra=3.2-6.3 µm. Two short lengths of pipe are welded to each flange, each section of pipe being capped at the opposite end to the flange, to form an enclosed chamber; the test rig is mounted with the flanges horizontal, the test sample in between. An electrical heating element is fitted in the lower section; nitrogen is admitted through the top section, via valves which enable the rig to be isolated from the gas supply.

The flange specification is ASTM A 182 Gr. F11 or F12. The pipe specification is ASTM A 335 P11.

Flanges are fastened together using 8XASTM A 193 Gr. B16 stud bolts, with ASTM A 194 Gr4H nuts, lubricated with high temperature lubricant (molybdenum sulphide grease or similar); tension is applied preferably using hydraulic bolt tensioners, the permitted range of final bolt stress being 210-350 N/mm$^2$ (the stress used in the tests described is 300 N/mm$^2$). Once stressed, the test proceeds as follows:
1. Pressurise the vessel to 51 bar (750 psi) and isolate the rig from the gas supply. After a settling period of 30 minutes, the actual pressure is measured, then again after an interval of 1 hour.
2. Depressurise the rig, heat to 450° C. at a rate of 100° C./hour, then re-pressurise to 33 bar (500 psi). Allow the temperature of the rig to stabilise at 450° C., then measure the actual starting pressure, and again after 1 hour. Allow the rig to cool to ambient temperature (in any case, not more than 50° C.) and reheat; record pressure at the end of a 1 hour dwell at 450° C., then repeat the cooling/heating cycle. At the end of the final dwell at temperature, the pressure is again recorded.

The test procedure is detailed in the Shell document:
"Requirements for Asbestos Substitutes for Jointing, Packing & Sealing" (Dol, Robbe & Voogd; issued May 1992 c/o Shell International Petroleum Maatschappij B.V., The Hague).

Summary of Test Results

Results of the testing of the gaskets prepared from the resilient strip are summarised below: all are ASME B 16.20 4" Class 300 spirals with inner and outer rings using 316 stainless steel as the support strip for the spiral. The preferred construction is to use a winding pressure of generally 40 psi, with 4 inner and 5 outer winds of steel. Polymer-free strip was tested and, to improve resistance to water, polymer containing strip having 5% NBR binder (as solution) was also tested as per the formulation in Method A.

The construction and composition of samples 1-9 are detailed below.

TABLE 1

Summary of Samples 1-9

| | |
|---|---|
| Sample 1 | Polymer free filler; 3 inner winds and 4 outer winds steel; wound at 40 psi. |
| Sample 2 | Repeat of above. |
| Sample 3 | Polymer free filler; 4 inner winds and 5 outer winds steel; wound at 40 psi. |
| Sample 4 | Repeat of above. |
| Sample 5 | As Sample 3, but with 5% NBR filler (incorporated as latex) |
| Sample 6 | As Sample 3, but with 5% NBR filler (incorporated as solution) |
| Sample 7 | As Sample 6, wound at 20 psi |
| Sample 8 | As Sample 6, with filler dried but not cured*. |
| Sample 9 | As Sample 5 with latex based filler (21/2%) on 0.05 mm steel. (Test performed at 200 psi and 450° C. When tested, at 500 psi and 450° C., the pressure drop was an unacceptable 200 psi (~14 bar) after ½ hour of first dwell at 450° C.). |

*Samples 5-7 have filler cured before winding (180° C./1 hour).

TABLE 2

Test Results, Samples 1–9

| | RT Pressure (bar) | | Pressure at Temperature (bar) | | | |
|---|---|---|---|---|---|---|
| Sample | Initial | Final | Initial | 1$^{st}$ Cycle | 2$^{nd}$ Cycle | 3$^{rd}$ Cycle |
| 1 | 50.5 | 50.5 | 33.4 | 33.4 | 32.5 | 31.8 (1.6) |
| 2 | 50.9 | 50.9 | 33.6 | 33.6 | 33.3 | 32.1 (1.5) |
| 3 | 51.2 | 51.2 | 33.0 | 33.0 | 32.9 | 32.1 (0.9) |
| 4 | 51.3 | 51.3 | 32.9 | 32.9 | 32.1 | 31.7 (1.2) |
| 5 | 50.2 | 50.2 | 34.1 | 34.0 | 32.8 | 31.8 (2.3) |
| 6 | 51.2 | 51.2 | 33.8 | 33.7 | 32.7 | 31.7 (2.0) |
| 7 | 51.0 | 51.9 | 34.0 | 34.0 | 31.4 | 29.4 (4.6) |
| 8 | 51.3 | 51.3 | 33.0 | 33.0 | 31.9 | 30.9 (2.1) |
| 9 | 51.4 | 51.4 | 14.4 | 11.8 | 3.3 | 2.5 (11.9) |

FIGURES in parentheses denote pressure loss after three thermal cycles.

Method A

The paste is prepared as follows (Z-Blade mixer):

| | |
|---|---|
| Grace Microlite HTS Dispersion | 18.07 kg |
| Grace Microlite PCEV Powder | 9.49 kg |
| Grace FPSV powder | 6.58 kg |
| NBR Solution* | 6.10 kg |
| Silquest A151 Silane** | 0.19 kg |

NB - FPSV is fine-milled TEV.
*this is prepared in a Papenmaier high sheer, high speed solution mixer; add 500 g NBR crumb to 2500 g toluene, mix 5 min (max speed), add 31.3 g Perkadox BK 40B (peroxide curing agent), mix 5 min further and then transfer into sealable container.
**equivalent to 0.103 kg silane (ethanol solution).

a) Add all except silane and rubber solution. Mix 5 min.
b) Add silane and mix 5 min.
c) Add NBR solution and mix 5 min. Dump into clean plastic bag and seal in plastic tub.

Variations on Method A

Latex based paste, also containing 5% by dry weight of NBR incorporated in the form of water-based latex (40% solids) so that 2.50 kg of latex is equivalent to the 6.10 kg of rubber solution (sample 5). Polymer-free paste, in which the polymer has been omitted from the above formulation (samples 1-4). 2½% latex paste prepared by halving quantity of latex in sample 5 above (Sample 9).

Further Examples

Two further samples were prepared as previously described, but using a solvent-free variant of the paste based on nitrile latex (Breon 1562 (NBR latex) –40% solids). This is mixed according to the given cycle, substituting 1.02 kg of latex for the rubber solution. The removal of the solvent is intended to allow paste to be transported safely (particularly by air-freight).

Method of Application

The paste needs to be applied in the form of a thick slurry ("buttercream" consistency) and is prepared by thinning the paste formulations which are described below by adding water. Take 2 parts of paste (up to 2 kg) break up into handful sized lumps in a clean container and pour over 1 part of water (by weight), stir to a consistent texture. The preferred formulation for the paste (without the additional water) is described below. An even coat of paste which dries to approximately 0.6 mm thickness is applied to a forming sheet thickness of up to 0.1 mm using a doctor blade set to about 2 mm. The paste may be allowed to dry at room temperature, whereupon the forming sheet is then removed to leave a film of paste. The paste layer is then dried further, at 120° C., the film in the form of a strip 124 mm wide by up to 5 m long is then slit and wound. Typically the film is passed through crimping rollers beforehand to make it more flexible.

Alternatively, the paste may be applied by using a "double" blade, so that one applies a coarse coat of the slurry, and the second smooths it out, regulating the thickness and removing any air bubbles at the same time.

In one method, the possibility is envisaged of driving the forming sheet, so that it moves at a constant rate through the coating device.

The CEV used was W R Grace's HTS dispersion which is approximately 15% solids. The dry CEV used was W R Grace's "Microlite Powder". The FPSV was also obtained from W R Grace. The rubber used in these examples was either nitrile rubber N36C80 from Zeon.

The reader's attention is directed to all papers and documents which are filed concurrently with or previous to this specification in connection with this application and which are open to public inspection with this specification, and the contents of all such papers and documents are herein incorporated herein by reference in their entirety.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A spirally wound gasket comprising a sealing strip comprising a resilient material, the resilient material comprising a chemically exfoliated vermiculite (CEV) component in a proportion of at least 25% w/w of the sealing strip, the said CEV component being at least partially derived from dry CEV, wherein the sealing strip does not include a carrier strip, made by the process of:
  (a) applying a wet sealing material to a forming sheet to form a layer;
  (b) partially drying the wet sealing layer on the forming sheet;
  (c) removing the partially dried sealing layer from the forming sheet; and
  (d) cutting the partially dried sealing layer into strips suitable for use in the formation of a spirally wound gasket.

2. The gasket of claim 1, wherein the solids content of the wet sealing material prior to the drying step is in the range of 20-70% w/w of the material.

3. The gasket of claim 1, wherein step (c) is carried out after step (d).

4. The gasket of claim 1, wherein the solids content of the wet sealing material is in the range 25-60% w/w of the wet material.

5. The gasket of claim 1, wherein the water content of the partially dried sealing layer during removal from the forming sheet is 3-20% w/w.

6. The gasket of claim 1, wherein a further drying step is carried out after removal of the partially dried sealing layer from the forming sheet.

7. The gasket of claim 1, wherein the wet sealing layer is dried at temperatures between 50-135° C.

8. The gasket of claim 1, wherein the wet sealing material is in the form of a spreadable paste.

9. The gasket of claim 1, wherein the wet sealing material comprises a CEV component comprising a mixture of dried CEV and CEV in a slurry form.

10. The gasket of claim 1, wherein the CEV component further comprises a plate-like filling agent.

11. The gasket of claim 10, wherein the filling agent is present in an amount less than 75% w/w of the sealing strip.

12. The gasket of claim 10, wherein the plate-like filling agent is thermally exfoliated vermiculite (TEV).

13. The gasket of claim 1, wherein the wet sealing material is applied to the forming sheet by a spreading technique.

14. The gasket of claim 13, wherein the spreading technique comprises the application of a doctor blade.

15. The gasket of claim 1, wherein the resilient material further comprises a hydrolysis resistant polymer.

16. The gasket of claim 15, wherein the hydrolysis resistant polymer is present in an amount equal to or less than 20% w/w of the sealing strip.

17. A spirally wound gasket comprising a sealing strip comprising a resilient material, the resilient material comprising a chemically exfoliated vermiculite (CEV) component in a proportion of at least 25% w/w of the sealing strip, the said CEV component being at least partially derived from dry CEV, wherein the sealing strip does not include a carrier strip.

18. The gasket of claim 17, wherein the CEV component further comprises a plate-like filling agent.

19. The gasket according to claim 18, wherein the filling agent is present in an amount less than 75% w/w of the sealing strip.

20. The gasket of claim 17, wherein the water content of the sealing strip is less than 20% w/w.

21. The gasket of claim 18, wherein the plate-like filling agent is thermally exfoliated vermiculite (TEV).

22. The gasket of claim 17, wherein the resilient material further comprises a hydrolysis resistant polymer.

23. The gasket of claim 22, wherein the hydrolysis resistant polymer is present in an amount equal to or less than 20% w/w of the sealing strip.

\* \* \* \* \*

UNITED STATES PATENT AND TRADEMARK OFFICE
CERTIFICATE OF CORRECTION

| | | |
|---|---|---|
| PATENT NO. | : 8,876,118 B2 | Page 1 of 1 |
| APPLICATION NO. | : 10/886736 | |
| DATED | : November 4, 2014 | |
| INVENTOR(S) | : John Robert Hoyes and Stephen Woolfenden | |

It is certified that error appears in the above-identified patent and that said Letters Patent is hereby corrected as shown below:

On the Title Page

Below the paragraph beginning with Item "(*) Notice: Subject to any disclaimer, the term of this patent is extended or adjusted under 35 U.S.C. 154(b) by 1663 days." delete the following paragraph:

"This patent is subject to a terminal dis-claimer."

Signed and Sealed this
Twenty-fourth Day of February, 2015

Michelle K. Lee
*Deputy Director of the United States Patent and Trademark Office*